United States Patent [19]
Reynolds

[11] Patent Number: 5,911,629
[45] Date of Patent: Jun. 15, 1999

[54] COUPLING DEVICE HAVING A CONTINUOUS FLEXIBLE COUPLING ELEMENT

[75] Inventor: David F. Reynolds, Greer, S.C.

[73] Assignee: Reliance Electric Industrial Company, Cleveland, Ohio

[21] Appl. No.: 08/602,082

[22] Filed: Feb. 15, 1996

[51] Int. Cl.⁶ .................................................. F16D 3/50
[52] U.S. Cl. ............................................................ 464/80
[58] Field of Search ................................ 464/80, 87, 88, 464/182

[56] References Cited

U.S. PATENT DOCUMENTS

| | | |
|---|---|---|
| 1,501,187 | 7/1924 | Rayfield . |
| 2,945,365 | 7/1960 | Ulderup et al. . |
| 3,020,737 | 2/1962 | Firth ........................................ 464/80 |
| 3,068,665 | 12/1962 | Firth . |
| 3,178,096 | 4/1965 | Ricketts ................................... 464/80 |
| 3,233,427 | 2/1966 | Firth . |
| 3,250,090 | 5/1966 | Thompson . |
| 3,283,535 | 11/1966 | Grundtner ................................ 464/80 |
| 3,457,731 | 7/1969 | Wellauer et al. ......................... 464/80 |
| 3,468,138 | 9/1969 | Downey .................................. 464/80 |
| 3,524,332 | 8/1970 | Callies .................................... 464/80 |
| 3,531,949 | 10/1970 | Downey . |
| 3,545,231 | 12/1970 | Downey . |
| 3,727,429 | 4/1973 | Downey . |
| 3,789,924 | 2/1974 | Downey . |
| 3,793,849 | 2/1974 | Downey . |
| 3,888,093 | 6/1975 | Downey . |
| 4,175,406 | 11/1979 | Downey . |
| 4,365,964 | 12/1982 | Krome, Jr. . |
| 4,443,205 | 4/1984 | Grant . |
| 4,536,170 | 8/1985 | Downey ................................... 464/80 |
| 4,634,400 | 1/1987 | Butzow et al. ........................... 464/88 |
| 4,730,951 | 3/1988 | Barnsfather . |

FOREIGN PATENT DOCUMENTS

| | | |
|---|---|---|
| 940080 | 7/1949 | Germany . |
| 1475320 | 11/1965 | Germany . |
| 1525341 | 3/1966 | Germany . |
| 2618320 | 4/1976 | Germany . |
| 369310 | 2/1973 | U.S.S.R. ................................. 464/80 |
| 475467 | 6/1975 | U.S.S.R. ................................. 464/80 |
| 502140 | 2/1976 | U.S.S.R. ................................. 464/80 |
| 1004680 | 3/1983 | U.S.S.R. ................................. 464/80 |
| 1754964 | 8/1992 | U.S.S.R. ................................. 464/87 |
| 935754 | 2/1959 | United Kingdom . |
| 1096428 | 4/1966 | United Kingdom . |

OTHER PUBLICATIONS

Dodge Para–Flex FBX Couplings catalog, Sep. 1995.
Reliance Electric Company; Dodge® & Waldron Couplings brochure; 1984.
Reliance Electric Company; Dodge® Para–Flex® FBX Couplings brochure; 1995.

*Primary Examiner*—Eileen Dunn Lillis
*Attorney, Agent, or Firm*—Timothy A. Cassidy; John M. Miller; John J. Horn

[57] ABSTRACT

A flexible coupling device is disclosed adapted to connect a first rotatable shaft with a second rotatable shaft. The coupling device generally includes a pair of opposing hubs, each of which is adapted to be secured to a respective shaft. A continuous and flexible coupling element extends between the hubs. The coupling element is nonremovably associated with a pair of inner clamp rings, each adapted to be connected to one of the hubs. The coupling element can be molded about the inner clamp rings and can be adhesively secured to the rings.

24 Claims, 2 Drawing Sheets

COUPLING DEVICE HAVING A CONTINUOUS FLEXIBLE COUPLING ELEMENT

FIELD OF THE INVENTION

The present invention generally relates to a flexible coupling device, and more particularly to a flexible coupling device having a continuous elastomeric coupling element.

BACKGROUND OF THE INVENTION

The present invention is generally directed to flexible coupling devices of the type that are adapted to connect the end of a first shaft with the end of a second shaft. Such coupling devices are used, for instance, to transmit rotary or torsional power from a driven rotating shaft to an adjacent non-driven shaft. The coupling devices also provide flexibility for interconnecting a pair of opposing shafts that are slightly out of alignment.

More particularly, the present invention is directed to a flexible coupling device having a "tire style" coupling element. These types of coupling devices typically include a pair of opposing hubs, each mounted to the end of a respective rotatable shaft. The hubs are connected by a flexible, circular coupling element generally having the shape of a tire. In order to connect the opposing hubs together, each side of the coupling element is mechanically clamped between one of the hubs and an internal clamp ring.

One example of a shaft coupling device as described above is disclosed in U.S. Pat. No. 4,536,170 to Downey, which is incorporated herein in its entirety by reference. In Downey, an elastomeric sheer shaft coupling is disclosed for connecting two rotatable shafts in an end-to-end relationship. The coupling includes hubs for mounting on the opposed ends of the shafts with a flexible element extending between the hubs. The flexible coupling element is reinforced with layers of fabric or cord interspersed in an elastomeric material. Further, the margins of the coupling element have a bead therein of elastomeric material that has a higher durometer value than that forming the body of the element. The bead and the fabric are included to reinforce the element and to prolong its effective life.

Prior art constructions of coupling devices incorporating "tire style" coupling elements have provided meritorious advances in devices used to connect the ends of opposing shafts. Besides connecting the shafts together, these types of devices can accommodate slight amounts of angular misalignment and/or parallel misalignment. The flexible coupling element also cushions shock loads, putting much less stress on the industrial machinery associated with the shafts. Further, the flexible coupling element can dampen torsional vibration caused by the various engines and motors used to drive the shafts.

Most tire style coupling elements, however, include a slit which completely severs the element. The slit is provided for allowing the coupling element to be placed over a pair of internal clamp rings when being secured to the opposing hubs. The slit, unfortunately, lowers the overall strength and reduces the maximum amount of speed and torque which may be placed on the coupling element.

SUMMARY OF THE INVENTION

The present invention is directed to further improvements in coupling devices containing a flexible coupling element. In particular, the present invention is directed to a coupling device having a continuous coupling element that is nonremovably associated with a pair of inner clamp rings. As used herein, the term continuous means that the coupling element is unitary and does not contain a slit as described above. By incorporating a continuous coupling element, the coupling device of the present invention can accommodate higher torques and speeds when in use. Further, the coupling device has inherently better balance than conventional devices containing a separated coupling element.

Accordingly, it is an object of the present invention to provide a flexible coupling device adapted to connect an end of a first shaft to an end of a second shaft.

Another object of the present invention is to provide a coupling device having a flexible and continuous coupling element.

Still another object of the present invention is to provide a coupling device having a continuous coupling element that is nonremovably associated with a pair of inner clamp rings.

It is another object of the present invention to provide a coupling device having a continuous coupling element with a pair of inner clamp rings embedded within the sides of the element.

Another object of the present invention is to provide a flexible coupling device having a continuous coupling element that is adhesively secured to a pair of inner clamp rings.

Additional objects and advantages of the invention will be set forth in the following description, or may be obvious from the description, or may be learned through practice of the invention.

The objects of the present invention are achieved by providing a coupling device adapted to connect an end of a first shaft to an end of a second shaft. The coupling device includes a pair of opposing hubs, each adapted to be secured to a respective shaft. Each hub includes an outer ring facing towards the opposing hub. A first inner clamp ring and a second inner clamp ring are provided and are adapted to be secured to the first and second hubs respectively.

The coupling device further includes an elastomeric continuous coupling element extending between the opposing hubs. The coupling element is nonremovably formed about the inner clamp rings. The coupling element has a U-shaped cross-sectional configuration including a first side and a second side. The first side of the element is clamped between the first inner clamp ring and the outer ring of the first hub. The second side of the element, on the other hand, is clamped between the second inner clamp ring and the outer ring of the second hub.

In one embodiment, the inner clamp ring can be adhesively secured to the sides of the coupling element. Alternatively, the inner clamp rings can be embedded within the sides of the coupling element. The coupling element can be made from an elastomeric material, such as natural rubber, neoprene rubber, a urethane, or EPDM. In order to reinforce the coupling element, at least one tension member can be embedded within the elastomeric material. For instance, the tension member can be made from a polyester fabric.

The flexible coupling element can also include a flange portion at the end of each side that is shaped to engage and interlock with the outer rings of the opposing hubs. In one embodiment, each of the opposing hubs includes a ring separating member positioned between the outer ring and the complementary inner clamp ring. Alternatively, each opposing hub includes a flange that is secured to the rotating shaft. The flange can be connected to the outer ring of each hub.

These and other objects are also achieved by providing a coupling device having a pair of opposing hubs, each adapted to be secured to a respective shaft. Each hub includes an outer ring facing towards the opposing hub. An elastomeric continuous coupling element extends between the opposing hubs. The coupling element defines an inner channel spaced between a first side and a second side.

A first inner clamp ring is positioned within the inner channel and is adhesively secured to the first side of the coupling element. The first inner clamp ring is connected against the outer ring of the first hub, securing the first side of the coupling element therebetween.

The coupling device further includes a second inner clamp ring also positioned within the inner channel and adhesively secured to the second side of the coupling element. The second inner clamp ring is connected against the outer ring of the second hub and secures the second side of the coupling element therebetween.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
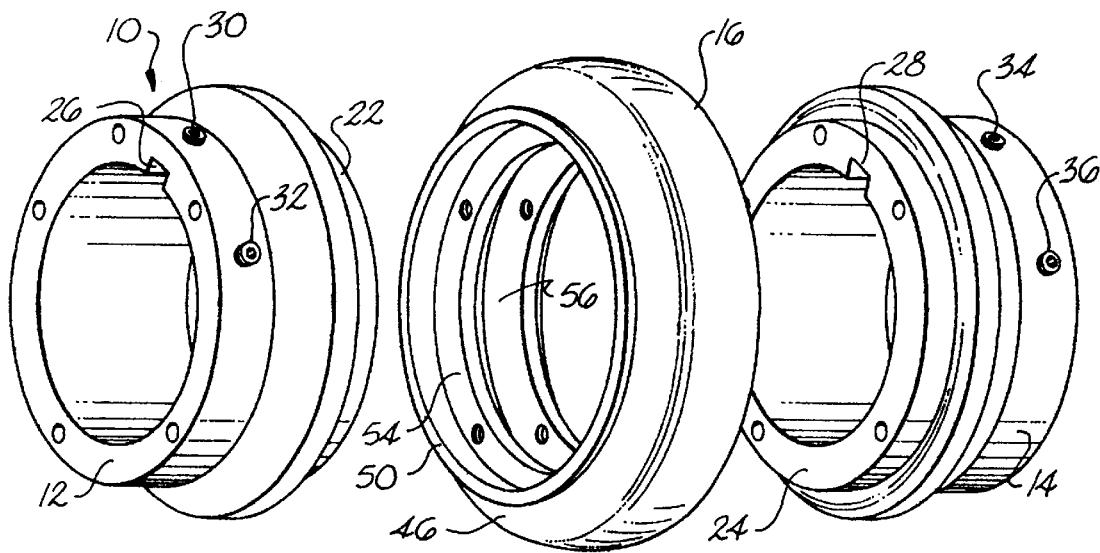
FIG. 1 is a perspective view of one embodiment of a coupling device made according to the present invention shown in a disassembled state.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

In general, the present invention is directed to coupling devices of the type that are adapted to connect an end of a first shaft to an end of a second shaft. The coupling device includes a "tire-style" flexible coupling element made from an elastomeric material. The coupling element is flexible in that it can accommodate some misalignment between the opposing shafts. According to the present invention, the flexible coupling element is a continuous and unitary structure.

Figure 2:
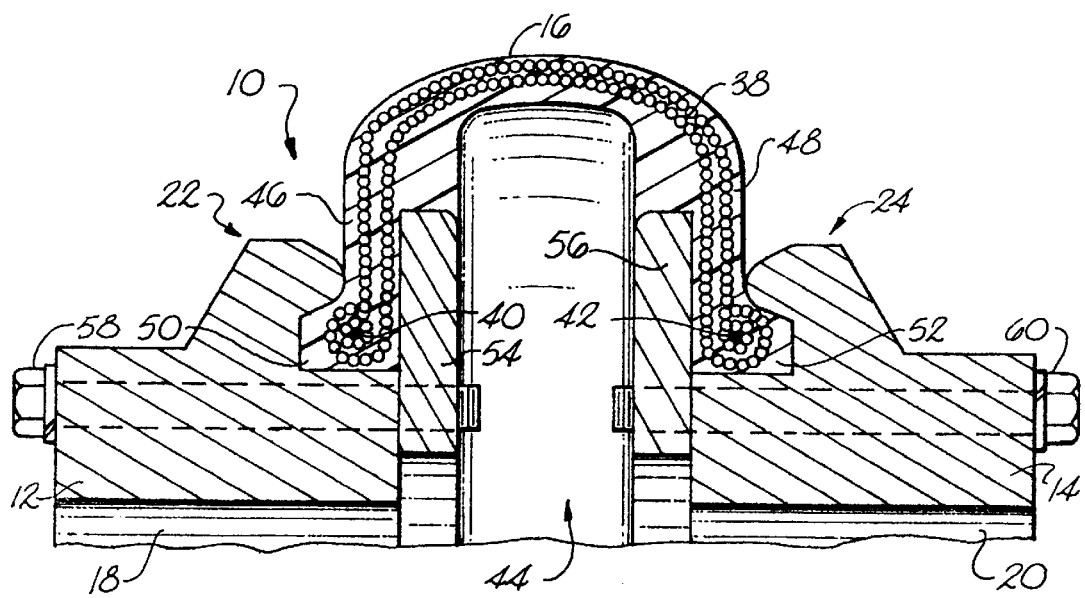
FIG. 2 is a cross-sectional view of the coupling device shown in FIG. 1.

Referring to FIGS. 1 and 2, one embodiment of a coupling device, generally 10, made in accordance with the present invention is illustrated. Coupling device 10 includes a pair of opposing hubs 12 and 14, which can be interconnected by a flexible and continuous coupling element 16. As shown in FIG. 2, coupling device 10 is adapted to connect a first rotatable shaft 18 with a second rotatable shaft 20. Through coupling device 10, rotary or torsional power can be transmitted from first shaft 18 (the driving shaft) to second shaft 20 (the driven shaft).

The connected shafts may be of equal size as shown in FIG. 2 or, alternatively, the shafts may be of different diameters. Ideally, the two shafts will be in precise axial alignment. However, this is often not the case, and the shafts may exhibit slight amounts of angular misalignment, parallel misalignment and/or endfloat. Being made from an elastomeric material, flexible coupling element 16 of coupling device 10 is capable of accommodating any of these types of misalignment. Further, flexible coupling element 16 also cushions shock loads caused by the machinery connected to shafts 18 and 20 and dampens torsional vibrations.

Hubs 12 and 14 include respective outer rings 22 and 24 which are adapted to be mounted against and connected to coupling element 16, as will be described in more detail hereinafter.

Hubs 12 and 14 are each adapted to be placed upon and secured to a respective rotatable shaft. For instance, in the embodiment shown in FIG. 1, hub 12 includes a key receiving notch 26, while hub 14 includes a key receiving notch 28. When hub 12 is placed on a shaft, key receiving notch 26 is placed in alignment with a keyway formed into the shaft. A rectangular key is then inserted into key receiving notch 26 and into the corresponding keyway formed into the shaft. Hub 12 thus becomes secured to the shaft during rotation. Hub 12 is then further secured to the shaft by set screws 30 and 32. Specifically, set screws 30 and 32 prevent hub 12 from sliding along the shaft. As shown in FIG. 1, it has been found that having two set screws at an angle of approximately 65 degrees provides the most optimum holding force.

Hub 14 can be secured to an opposing shaft using similar means. As shown, hub 14 also includes a pair of set screws 34 and 36.

When hub 12 or hub 14 is mounted to a shaft of smaller diameter, the hub can include a tapered bore through which the shaft is inserted. A split contractible bushing having an outer circumferential surface that is oppositely tapered relative to the tapered bore of the hub can be placed between the hub and the shaft. Using screws, the bushing can then be tightened drawing the tapered surfaces together and securing the hub on the shaft.

As stated above, once secured to opposing shafts, hubs 12 and 14 are interconnected by flexible coupling element 16. According to the present invention, coupling element 16 is continuous and is made from a suitable elastomeric material. Such materials can include, for instance, a natural rubber, a neoprene rubber, EPDM, a polyurethane, a urethane blend, or any other suitable material. EPDM refers to ethylene and propylene terpolymers with nonconjugated dienes. In one embodiment, the elastomer used to make coupling element 16 has a Shore A hardness of between about 60 to about 70.

As shown in FIG. 2, coupling element 16 can also be reinforced with a tension member 38. Tension member 38 can be made from a ply or plies of cord or fabric, such as polyester fabric. Preferably, two-plys of a polyester fabric having a weight of 11.04 ounces and having 25.37 ends per inch is used that are laid at 90 degrees to each other within the elastomeric coupling element. Also, preferably beads 40 and 42 made from an elastomeric material harder than the material used to make coupling element 16 are placed at the outer edges of tension member 38. Beads 40 and 42 reinforce the sides of coupling element 16 when clamped to hubs 12 and 14.

Flexible coupling element 16 has a "tire-like" shape. As shown in FIG. 2, coupling element 10 has a U-shaped cross-sectional configuration defining an inner channel 44 spaced between a first side 46 and a second side 48. Further, at the ends of sides 46 and 48 are respective flange portions 50 and 52.

Adjacent to side 46 and side 48 of coupling element 16 are positioned a pair of inner clamp rings 54 and 56. Inner clamp rings 54 and 56 have threaded bores in axial alignment with bores running through hubs 12 and 14. As shown in FIG. 2, a lug 58 is used to connect inner clamp ring 54 to hub 12, while lug 60 connects inner clamp ring 56 to hub 14. When inner clamp rings 54 and 56 are tightened against hubs 12 and 14 respectively, the sides of coupling element 16 become clamped or otherwise secured between inner clamp rings 54 and 56 and outer rings 22 and 24. As shown, outer rings 22 and 24 are shaped to interlock with flange portions 50 and 52 respectively. In this manner, coupling element 16 becomes securely fastened between hubs 12 and 14.

According to the present invention, besides flexible coupling element 16 being continuous, inner clamp rings 54 and 56 can also be nonremovably held by coupling element 16. As used herein, the phrase, nonremovably held, means that the inner clamp rings cannot be removed from inner channel 44 of coupling element 16 unless either the coupling element or the inner clamp rings are damaged. As shown in FIGS. 1 and 2, inner clamp rings 54 and 56 are contained within coupling element 16 forming a unitary structure. As shown in FIG. 2, flexible coupling element 16 can border inner clamp rings 54 and 56 along the top and along one side. Many advantages are achieved by having the inner clamp rings be nonremovably held by the coupling element as will be described and made apparent from the following description.

In a preferred embodiment, flexible coupling element 16 is molded or formed about inner clamp rings 54 or 56. For instance, a collapsible, multipiece center core defining the shape of innerchannel 44 of coupling element 16 can be placed adjacent to a pair of inner clamp rings and wrapped with rectangular sheets of elastomeric material. When wrapping the center core, plies of reinforcing fabric, such as polyester, can be alternated with the elastomeric material. Once a sufficient amount of elastomeric material has been applied to the core, the core can be placed into a heated mold where the elastomeric material is formed into the coupling element and is vulcanized.

For instance, when using natural rubber, the mold can be heated to a temperature of approximately 300 degrees fahrenheit and the core wrapped with the elastomeric material can be placed in the mold under pressure for about 30 minutes. Once removed from the mold, the center core can be disassembled and removed leaving behind the inner clamp rings encased within flexible coupling element 16.

If desired, inner clamp rings 54 and 56 can be completely embedded within insides 46 and 48 of coupling element 16. Also, inner clamp rings 54 and 56 can have holes to promote mechanical interlocking and encapsulation during molding and formation of elastomeric coupling element 16.

In an alternative embodiment, an adhesive can be used to bond inner clamp rings 54 and 56 to sides 46 and 48 respectively. For instance, if inner clamp rings 54 and 56 are made of a metal, one adhesive that is suitable for bonding an elastomeric material to the inner clamp rings is CHEM-LOCK marketed by Houston Chemicals. Of course, any suitable adhesive for bonding elastomeric materials to either metals or plastics may be used.

Many advantages are achieved by providing a continuous coupling element nonremovably associated with the inner clamp rings. As discussed above, in the past most coupling devices of the type described herein were made with a split coupling element. In comparison to these conventional coupling devices, the coupling device of the present invention is capable of accommodating higher torques and speeds. Also, because the coupling element is continuous, the coupling device of the present invention has inherently better balance.

Figure 3:
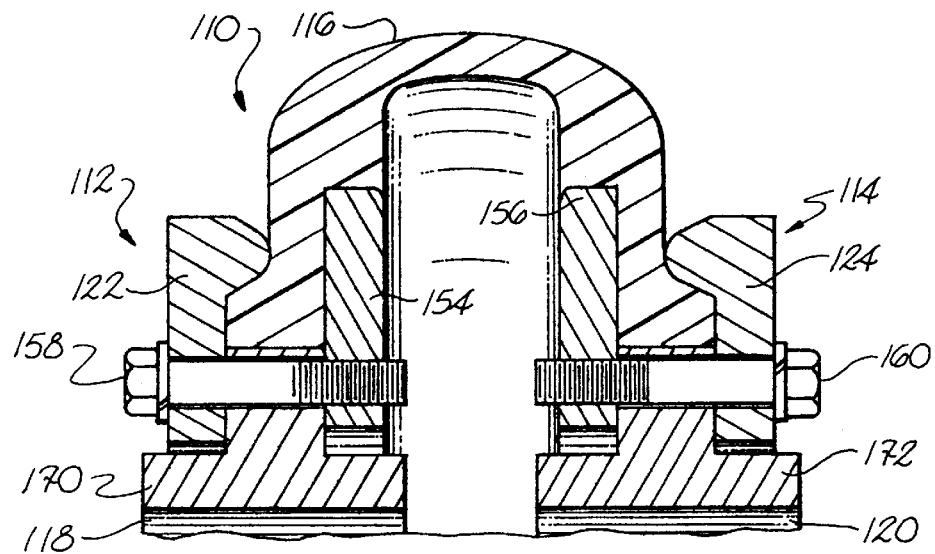
FIG. 3 is a cross-sectional view of another embodiment of a coupling device made according to the present invention.

Referring to FIG. 3, another embodiment of a coupling device generally 110 made in accordance with the present invention is shown. Coupling device 110 includes a first hub generally 112 mounted to a shaft 118 and a second hub generally 114 mounted to an opposing shaft 120. A flexible, continuous coupling element 116 interconnects first hub 112 to second hub 114. Coupling element 116 is nonremovably associated with a pair of inner clamp rings 154 and 156.

In this embodiment, hubs 112 and 114 have a two-piece configuration. Specifically, hub 112 includes an outer ring 122 adjacent to a ring separating member 170. Similarly, hub 114 includes an outer ring 124 and a ring separating member 172. As shown, lugs 158 and 160 connect the inner clamp rings to the outer rings, securing the sides of coupling element 116 therebetween.

Figure 4:
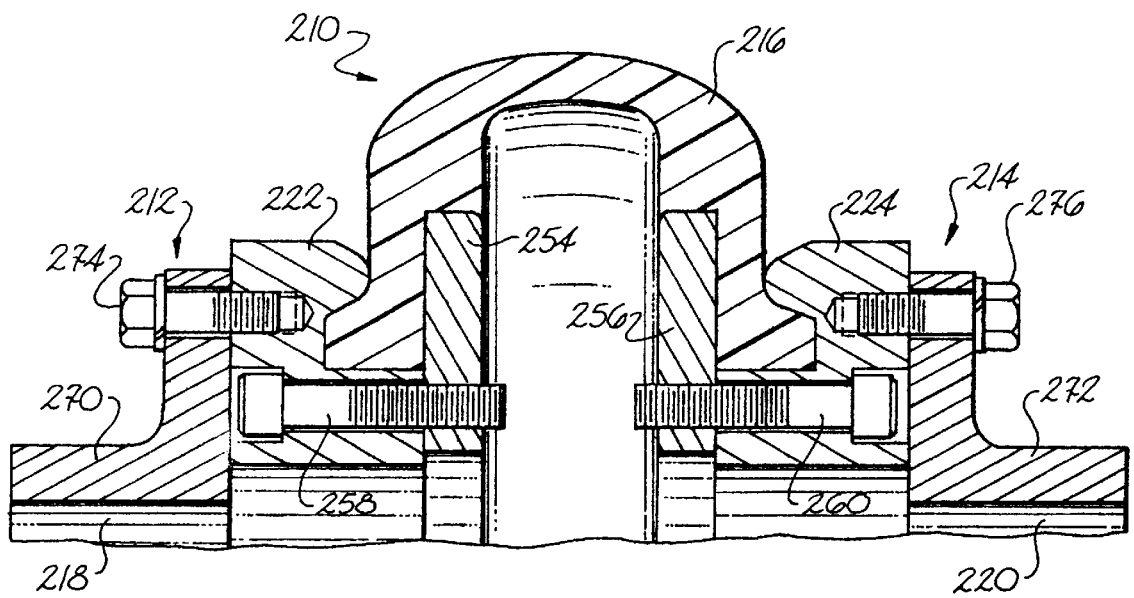
FIG. 4 is a cross-sectional view of a further embodiment of a coupling device made in accordance to the present invention.

Referring to FIG. 4, another embodiment of a coupling device generally 210 also made in accordance with the present invention is shown. Coupling device 210 includes a first hub generally 212 mounted on a first shaft 218 and a second hub generally 214 mounted on an opposing shaft 220. In this embodiment, hub 212 includes an outer ring 222 separate from a flange 270, while hub 214 similarly includes an outer ring 224 separate from a flange 272. Flanges 270 and 272 are adapted to be secured to shafts 218 and 220 respectively.

First hub 212 is interconnected with second hub 214 by a continuous coupling element 216. Coupling element 216, made from an elastomeric material, is nonremovably associated with a pair of inner clamp rings 254 and 256. Inner clamp rings 254 and 256 are connected to outer rings 222 and 224 respectively by lugs 258 and 260.

Coupling element 216, inner rings 254 and 256, and outer rings 222 and 224, in this embodiment form a center assembly that is connected to flange 270 by lug 274 and to flange 272 by lug 276. In this arrangement, the center assembly can be removed and installed without disturbing the relative position of shafts 218 and 220. Coupling device 210 is particularly well suited for interconnecting a shaft of a motor with a shaft of a pump, where it is typically undesirable to move the connected units when servicing the machinery. By not having to disturb the relative position of the shafts, maintenance time is reduced.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A coupling device for connecting an end of a first shaft to an end of a second shaft, said coupling device comprising:

a first hub and a second opposing hub, each hub including
        an outer ring facing towards the opposing hub;

a first inner clamp ring removably secured to said first hub and a second inner clamp ring removably secured to said second hub; and an elastomeric continuous coupling element extending between said opposing hubs, said coupling element having a U-shaped cross-sectional configuration including a first side and a second side, said coupling element defining an axial inner surface and an axial outer surface, said coupling element being formed about said inner clamp rings such that said inner clamp rings are non-removably held and encased within said axial inner surface, wherein said first side of said coupling element is clamped between said first inner clamp ring and said outer ring of said first hub, while said second side is clamped between said second inner clamp ring and said outer ring of said second hub.

2. A coupling device as defined in claim 1, wherein said first and second inner clamp rings are adhesively secured to said axial inner surface of said coupling element.

3. A coupling device as defined in claim 1, wherein said first and second inner clamp rings are embedded within the first and second sides of said coupling element.

4. A coupling device as defined in claim 1, wherein at least one tension member is embedded within said coupling element for reinforcing the coupling element.

5. A coupling device as defined in claim 4, wherein said at least one tension member comprises a polyester fabric.

6. A coupling device as defined in claim 1, wherein each side of said coupling element includes a flange portion, said flange portions being engaged with said outer rings.

7. A coupling device as defined in claim 1, wherein said coupling element is made from a material selected from the group consisting of a natural rubber, a neoprene rubber, a urethane, and an EPDM.

8. A coupling device as defined in claim 1, wherein each of said hubs includes a ring separating member positioned between said outer ring and said respective inner clamp ring.

9. A coupling device as defined in claim 1, wherein each of said hubs includes a flange for securing each of said hubs to a respective shaft, said flanges being connected to said outer rings of each respective hub.

10. A coupling device as defined in claim 1, wherein said coupling element is in contact with at least two sides of each of said inner clamp rings.

11. A coupling device for connecting an end of a first shaft to an end of a second shaft, said coupling device comprising:

a first hub and a second opposing hub, each hub including an outer ring facing towards the opposing hub;

an elastomeric continuous coupling element extending between said opposing hubs, said coupling element including an inner channel spaced between a first side and a second side of said coupling element and defining an axial inner surface and an axial outer surface;

a first inner clamp ring non-removably held and encased within said inner channel about said axial inner surface and adhesively secured to said first side of said coupling element, said first inner clamp ring being removably connected to said outer ring of said first hub thereby securing said first side of said coupling element therebetween; and a second inner clamp ring non-removably held and encased within said inner channel about said axial inner surface and adhesively secured to said second side of said coupling element, said second inner clamp ring being removably connected to said outer ring of said second hub thereby securing said second side of said coupling element therebetween.

12. A coupling device as defined in claim 11, wherein said first inner clamp ring and said second inner clamp ring are embedded within the sides of said coupling element.

13. A coupling device as defined in clam 11, wherein said coupling element is made from a material selected from the group consisting a natural rubber, a neoprene rubber, a urethane and an EPDM.

14. A coupling device as defined in claim 11, wherein said coupling element is molded about said inner clamp rings.

15. A coupling device as defined in claim 11, wherein each side of said coupling element includes a flange portion, said flange portions being in interlocking engagement with said outer rings.

16. A coupling device for connecting an end of a first shaft to an end of a second shaft, said coupling device comprising:

a first hub and a second opposing hub, each hub including an outer ring facing towards the opposing hub;

an elastomeric continuous coupling element extending between said opposing hubs, said coupling element including an inner channel spaced between a first side and a second side of said coupling element, said coupling element defining an axial inner surface and an axial outer surface;

a first inner clamp ring non-removably held and embedded within said first side of said coupling element adjacent to said axial inner surface, said first inner clamp ring being removably connected to said outer ring of said first hub thereby securing said first side of said coupling element therebetween;

a second inner clamp ring non-removably held and embedded within said second side of said coupling element also adjacent to said axial inner surface, said second inner clamp ring being removably connected to said outer ring of said second hub thereby securing said second side of said coupling element therebetween.

17. A coupling device as defined in claim 16, wherein said coupling element is reinforced with a polyester fabric.

18. A coupling device as defined in claim 16, wherein an adhesive is employed to further bond said inner clamp rings to said coupling element.

19. A continuous and flexible coupling element for use in a flexible coupling device for connecting an end of a first shaft to an end of a second shaft, said coupling element for extending between and interconnecting a first hub with a second hub of a coupling device, said coupling element comprising:

a continuous and circular elastomeric shell including an inner channel spaced between a first side and a second side of said coupling element, said elastomeric shell defining an axial inner surface and an axial outer surface;

a first inner clamp ring non-removably held and encased within said axial inner surface of said elastomeric shell and positioned adjacent to said first side of said shell, said first inner clamp ring for connecting said coupling element to a first hub secured to a first rotatable shaft such that said first side of said shell is clamped between said first inner clamp ring and said hub; and a second inner clamp ring non-removably held and encased within said axial inner surface of said elastomeric shell and positioned adjacent said second side of said shell, said second inner clamp ring for connecting said coupling element to a second opposing hub secured to a second rotatable shaft such that said second side of said shell is clamped between said second inner clamp ring and said hub.

20. A continuous and flexible coupling element as defined in claim 19, wherein said elastomeric shell is reinforced by a polyester fabric.

21. A continuous and flexible coupling element as defined in claim 19, wherein said elastomeric shell is made from a material selected from the group consisting of a natural rubber, a neoprene rubber, a urethane, and an EPDM.

22. A continuous and flexible coupling element as defined in claim 19, wherein said inner clamp rings are adhesively secured to the sides of said elastomeric shell.

23. A continuous and flexible coupling element as defined in claim 19, wherein said elastomeric shell has been molded about said first and second inner clamp rings.

24. A continuous and flexible coupling element as defined in claim 19, wherein said first and second inner clamp rings are embedded within the first and second sides of said elastomeric shell.

* * * * *